United States Patent [19]

Wiley

[11] Patent Number: 4,657,428
[45] Date of Patent: Apr. 14, 1987

[54] QUICK CHANGE MECHANISM FOR CIRCULAR SAW BLADES AND OTHER SPINNING DISC DEVICES

[76] Inventor: Edward R. Wiley, 9020 SE. 51st Pl., Mercer Island, Wash. 98040

[21] Appl. No.: 774,331

[22] Filed: Sep. 10, 1985

[51] Int. Cl.$^4$ ............................................. F16B 7/00
[52] U.S. Cl. ..................... 403/359; 83/665; 83/666; 30/391; 30/388; 403/256; 403/315
[58] Field of Search ............... 83/665, 666; 30/391, 30/388; 403/359, 256, 257, 315, 316, 348

[56] References Cited

U.S. PATENT DOCUMENTS

| | | | |
|---|---|---|---|
| 2,089,168 | 8/1937 | Brown | 403/359 |
| 2,525,695 | 10/1950 | Lombard | 403/316 X |
| 2,886,358 | 5/1959 | Munchbach | 403/359 |
| 3,191,453 | 6/1965 | Hoven | 403/364 X |
| 3,262,471 | 7/1966 | McCarty | 30/391 X |
| 3,337,245 | 8/1967 | Prange | 403/327 |
| 4,205,572 | 6/1980 | Weiner | 30/388 X |
| 4,532,622 | 7/1985 | Newbold | 403/348 X |

FOREIGN PATENT DOCUMENTS

| | | | |
|---|---|---|---|
| 1339164 | 10/1963 | France | 74/431 |
| 673776 | 7/1979 | U.S.S.R. | 403/359 |

Primary Examiner—Andrew V. Kundrat
Assistant Examiner—Joseph A. Fischetti
Attorney, Agent, or Firm—Roy E. Mattern, Jr.

[57] ABSTRACT

In one embodiment of this quick change mechanism, a narrow six spline hub is installed in the arbor hole of a circular saw blade or other disc tool heads such as grinders, sanders and buffers. This hub slides onto a matching splined drive shaft in which a narrow section of spline lands has been removed circumferentially to fit the width of the splined hub that is secured to the circular saw blade. A fifteen degree rotation of this splined blade hub on this shaft aligns all the lands and grooves, thus locking the hub relative the longitudinal axis of the drive shaft. To continue the locking, by locking the hub in rotation relative to the shaft, a splined sliding collar with spline land extensions, serving as locking fingers, is interposed into the spline grooves of the drive shaft and also the hub grooves. A blind longitudinal hole in the drive shaft contains a compression spring and an unthreaded bolt. A pin inserted through: a hole in the sliding collar; a longitudinal slot in the drive shaft; and a hole in the central bolt, insures the sliding collar will move with the central bolt. The shaft slot limits the fore and aft movement of the sliding collar during locking to that axial distance required for the locking and unlocking functions. The spring keeps the sliding collar and its extensions in the forward locked position, and the head of the bolt extended out of the shaft end. Removal of the blade is done by pressing the bolt head toward the shaft, thereby clearing the locking fingers as the sliding collar is moved. Then the blade is rotated fifteen degrees to place hub spline lands into the drive shaft grooves. The blade is then ejected by spring pressure. Circular saw blade changes therefore are made in seconds without the use of tools, by utilizing this embodiment and other embodiments of this quick change mechanism.

13 Claims, 14 Drawing Figures

QUICK CHANGE MECHANISM FOR CIRCULAR SAW BLADES AND OTHER SPINNING DISC DEVICES

BACKGROUND OF THE INVENTION

This invention relates to mechanism for attachment and removal of circular saw blades on both motor driven hand held saws and stationary table saws. Also such mechanism handles other disc tool heads such as grinder wheels, sander discs and buffers.

Blade changes on power circular saws now on the market generally require the use of two tools, one tool to hold the blade, the other tool to unscrew the nut or bolt which holds the blade on the shaft of the saw. One brand of hand saw has a mechanism for locking the drive gears which eliminates the tool for holding the blade. However, they all have at least two or three nuts, bolts and washers which are removed from the shaft in a blade change operation. This is particularly incovenient in a cluttered workplace, where special tools provided by the saw manufacturer and/or removable parts are often lost. Today, at least ten special purpose saw blades are sold for use in cutting different materials and for different cutting results in the same material. To obtain best results the appropriate cutting blade should be used. When blade changes are difficult, time consuming, or when special tools are misplaced, blade changes are postponed or not done at all. Therefore there is a need for having a mechanism which is used to more quickly attach and remove circular saw blades, etc. and which is retrofitted to existing hand held power saws and table saws.

SUMMARY OF THE INVENTION

This invention provides a mechanism, in selected embodiments, to perform saw blade installations and removals in a few seconds, without using any tools. The mechanism is retrofitted to the most popular hand held and stationary saws, by modifying the existing drive shaft of the powered saw and by using a special circular saw blade holder. Moreover, in reference to table saws having long shafts designed for receiving conventional dado blade mounting, the mechanism is also retrofitted by modifying the existing drive shaft to provide both the quick change feature for circular saw blades having the special blade holders, while preserving the original capability of mounting multiple or single dado assemblies or multiple saw assemblies.

When this invention is used as an integral part of the original circular saw design which is then manufactured as original equipment, then only the arbor or direct drive shaft of power saws need be changed. Also eventually the power saws themselves may be changed to fully accpt the overall mechanism of this invention.

In one preferred embodiment of the quick change mechanism, pertaining to circular saw blade held power saws, the blade itself serves as the tool required for installation and removal. On many of these hand held power saws the rotating blade guard and/or, on some models, the presence of sawdust removal channels, leave very little lateral or axial space for blade insertion and removal. Using this preferred embodiment, the blade is inserted upwardly from below over the lock unlock button, and then the blade itself is used to depress the lock and unlock button. As the splined blade hub of the circular saw is thereafter aligned with the drive shaft, the circular saw blade is simply pressed on and quickly rotated. During such rotation, the now spring loaded locking mechanism acts with sufficient speed to allow only fifteen degrees of rotation at which angle or point in time, the sliding spline locking fingers pop out to secure the blade for its immediate use to cut material.

According to still further aspects of another preferred embodiment of this invention installed with respect to table saws equipped with long drive shafts used with 45 degree only tilt arbors, both modified and standard blades on dado heads are incorporated. This is done by cutting the splines, required for this quick change mechanism, into the threaded portion of the existing drive shaft, and also by installing an appropriately long central bolt for the lock/unlock button. Since the spline lock assembly is extremely short it is possible to provide a flange fitting which covers the quick change mechanism. This flange fitting rests on the arbor bearing, and is fitted to the drive shaft, at a location forward of the quick change mechanism. Also this flange fitting turns with the drive shaft. A conventional blade or dado set is held in place by this flange at the back, and a washer and nut in the front. The retaining nut uses the threads which remain on the spline lands, after the machining of the spline grooves on the long shafts.

Another preferred embodiment applies to table saws equipped with arbors capable of tilting 90 degrees, plus or minus 45 degrees from the vertical cut position. This embodiment involves an extremely short extension of the arbor mechanism beyond the plane of the rotating blade, which allows significantly deeper 45 degree cuts to be made than would be possible with a longer shaft extension. Other embodiments of the quick change mechanism, also increase the speed, whereby the cutter of various configurations are quickly installed and removed on all types of power saws.

DRAWINGS

The quick change mechanism for ciruclar saw blades and other spinning disc devices in various embodiments is illustrated in the drawings, wherein.

DESCRIPTION OF PREFERRED EMBODIMENTS

The quick change mechanism for circular saw blades and other spinning disc devices is illustrated in several embodiments in the drawings to indicate how basic components thereof are arranged to make this mechanism adaptable to many saws and their respective blades and combinations of blades. In FIGS. 3 through 11, the mechanism is shown in a preferred embodiment wherein a slide lock, also referred to as the complementary splined locking member, is positioned behind the removable circular saw blade, and in FIGS. 12 through 14 this slide lock is positioned in front of the removable circular saw blade. FIG. 11 indicates that multiple saw mountings and/or multiple dado blades are still used in conjunction with the utilization of this quick changeover mechanism. FIG. 11 also indicates that present available circular saws do not have to be altered to be used with this quick changeover mechanism.

Figure 1:
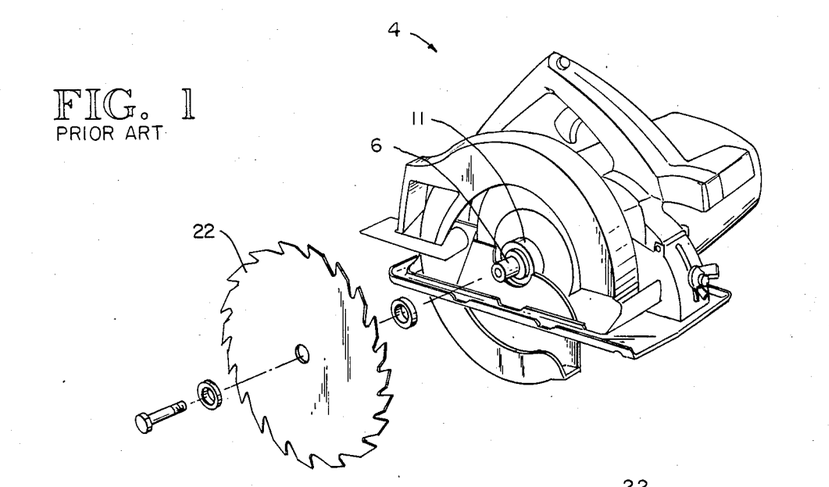
FIGS. 1 and 2 represent one of the most common prior art ways of securing a circular saw blade on a drive shaft of a hand held circular saw, with FIG. 1, as a partial exploded view, indicating the assembling procedure, and with FIG. 2 as a side view further indicating this assembling procedure requiring the utilization of threaded fastener assemblies and hand tools.
Figures 2, 3, 4, 5:
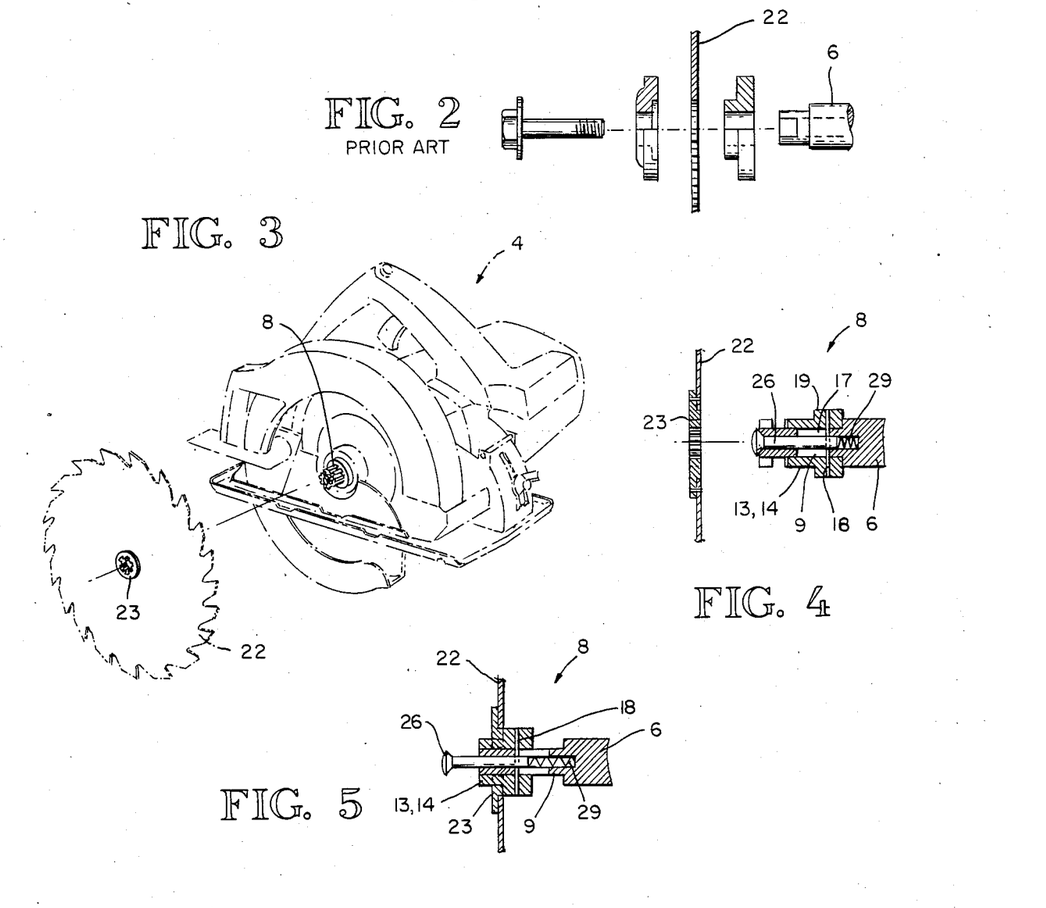
FIGS. 3, 4 and 5 illustrate an embodiment of the quick change mechanism which is manufactured, assembled and used, as set forth in this application, wherein no threaded fastener assemblies are used, and therefore no hand held wrenches are used when changing circular saw blades, as only finger and hand manipulations, without the use of tools, are undertaken to install and to remove circular saw blades, with FIG. 3 as a partial exploded view, indicating the assembling procedure, and with FIGS. 4 and 5 as side views, further indicating this assembly procedure, which does not require any utilization of threaded fastener assemblies, the circular saw being directed toward the drive shaft in FIGS. 3 and 4, and being secured thereto in FIG. 5.

Somewhat schematically, and in reference to the embodiment shown in FIGS. 3 through 11, FIGS. 1 and 2 are presented to initially indicate how much quicker a circular saw blade is either locked in place or unlocked and removed using this quick change mechanism, as illustrated in FIGS. 3, 4 and 5, in contrast to the time consuming procedure illustrated in FIGS. 1 and 2, generally disclosing the prior art procedure. As observed in FIGS. 1 and 2, the circular saw blade is held in place upon the tightening of a clamping screw. During both tightening and unloosening the clamping screw two hand held tools (not shown) are required. One tool keeps the blade and shaft or arbor from rotating and the other tool tightens or loosens the clamping screw. In contrast, as observed in FIGS. 3, 4 and 5, only the axial movement of the release button is necessary to unlock the mechanism, and a compression spring force moves the release button and slide lock, upon proper slight rotation of the saw, to again lock a circular saw blade in place without the utiliziation of any kind of wrenches.

Figures 6, 7:
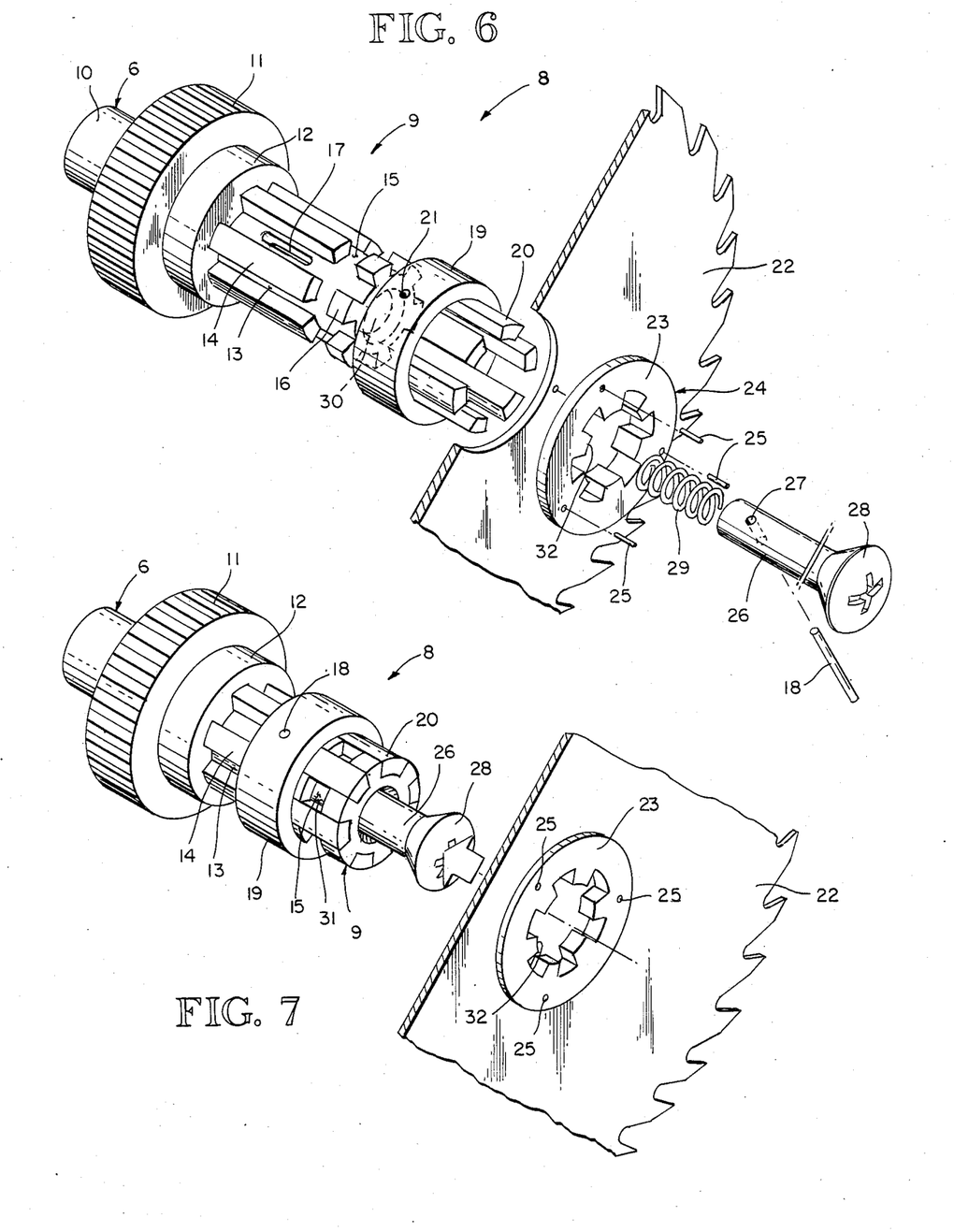
FIG. 6 is an exploded perspective view of all the parts required for the assembly of the quick change mechanism, indicating also the start of a typical drive shaft, and the entry drive gear, as they have been and still are formed and used in circular hand held power driven saws, which were and are still commonly sold, and also showing portions of a saw blade to which a spline adapter is to be added to interrelate to the quick change mechanism.
FIG. 7 is a perspective view of the assembled parts, previously shown in FIG. 6, illustrating the quick change mechanism in its ready to load position, to receive the saw blade having its spline adapter, and portions of the saw blade are cut away for purposes of the illustration.

A review of the embodiment illustrated in FIGS. 3 through 11 serves to further understand how very quickly the removal and replacement of a circulatr saw blade is undertaken as shown in FIGS. 3, 4 and 5. A typical hand operated powered circular saw 4 as shown in FIGS. 1 and 3, has a drive shaft 6, which is modified to become part of the overall quick release mechanism 8. As shown in FIG. 1, the drive shaft 6, has a rear arbor bearing surface 10, an arbor drive gear 11, and a forward arbor bearing surface 12, which remain unchanged. Then as shown in FIGS. 3 through 11, the original five eighths inch extended drive shaft 9 with a three eighths inch diameter threaded hole, which in FIG. 1 received a blade for mounting with washers and the clamping screw, is modified to interact as part of this quick change mechanism. The former smooth circumference of this extended drive shaft 9 is cut to provide six spline grooves 13 and six lands 14 as shown in FIG. 6. Thereafter, close to the end of this shaft 9, a circular or radial slot 15 is formed by cutting and removing a short section of all the six spline lands 14, as shown in FIG. 6. This removal of these short sections of all the six spline lands creates, in effect, six receiving spaces 31. Subsequently, this circular or radial slot 15 receives the circular saw blade 22, where it is positioned and both radially and axially locked during the cutting operations. The remaining forward portions 16 of the lands 14, form what are referred to as the lock lands 16. At this time of machining the extended drive shaft 9, longitudinal top and bottom slots 17 are provided to receive and to control the longitudinal axial movement of a transverse radial lock pin 18.

In respect to new parts machined to become a part of this quick change mechanism, a slide lock collar or complementary splined locking member 19 is made, as shown in FIG. 6. This collar 19 has inside complementary six spline grooves and lands to slidably fit over the six spline grooves 13 and lands 14 of the extended drive shaft 9. The interior lands extend out beyond the mainbody of this slide lock collar 19 to provide what are referred to as the locking fingers or extending lands of splines 20. Also aligned transverse holes 21 are drilled in the main body of this slide lock collar 19 at the top and bottom to position and to hold a lock pin 18 in place, which thereafter keeps the slide lock collar 19 in place about the extended drive shaft 9. Thereafter only the relative longitudinal movement equalling the length of the longitudinal slots 17 occurs in respect to the slide lock collar 19 moving along the extended drive shaft 9.

As another component of the quick change mechanism, in reference to this embodiment, and as shown in FIG. 6, a splined hub 23 is made and inserted into the arbor hole 24 of the circular saw blade 22. This hub 23 is secured with an adhesive, which allows the circular saw blade 22 to break loose of this hub 23, upon the occurrence of an unwanted high torque impact encountered by the revolving circular saw blade 22.

In addition, the blade insert hub 23 is attached with metal shear pins 25 to provide a safety feature against sudden stoppage or a gear lockup.

Another component of this quick change mechansim 8, is the central bolt 26, which has an unthreaded shaft drilled with a hole 27 to also receive the lock pin 18. The head of this bolt 28 serves as the unlock button 28, when pressed inwardly.

A compression spring 29 serves to maintain an outward pressure on this central bolt 26. This spring 29 and the bolt 26 are together inserted into a hole 30 drilled in the arbor shaft 9, which is also referred to as the extended drive shaft 9, as indicated in FIGS. 6 and 7.

With reference to FIG. 7, the parts, shown in FIG. 6 and described previously, are assembled, with the exception of the blade and splined hub assembly. During this assembly the slide lock collar 19 is fitted over the splines and lands 13, 14 of the arbor shaft 9 serving as the extended drive shaft 9. Also the lock pin 18 has been inserted through: the holes 21 in the slide lock 19; the slot 17 in the arbor shaft; and the hole 27 in the central bolt 26. This utilization of lock pin 18, locks the central bolt 26 to the slide lock collar 19. The longitudinal slot 17, as viewed in FIG. 6, allows fore and aft motion of the spring 29 loaded central bolt 26.

Figure 8:
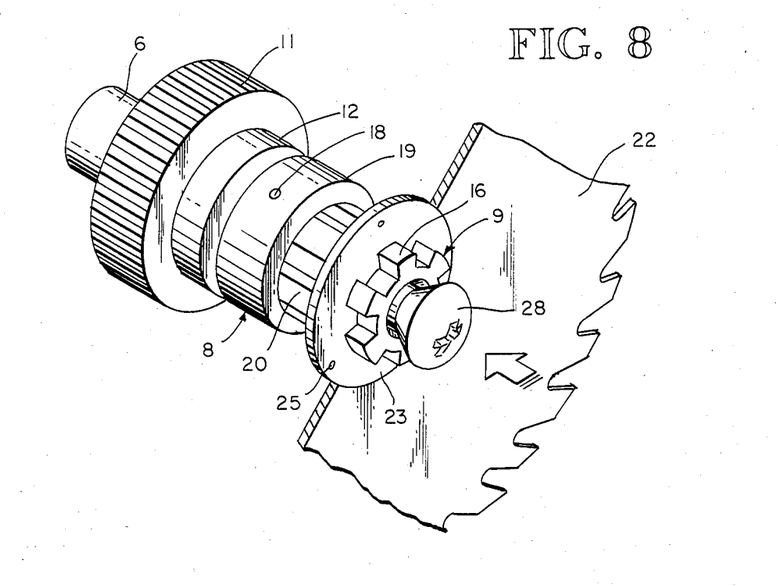
FIG. 8 is a perspective view of the blade and it spline adapter pressed directly onto the splined shaft, in the arrow indicated direction, illustrating both the initial insertion position, which is also the unlock eject position, and portions of the saw blade are cut away for purposes of illustration.
Figure 9:
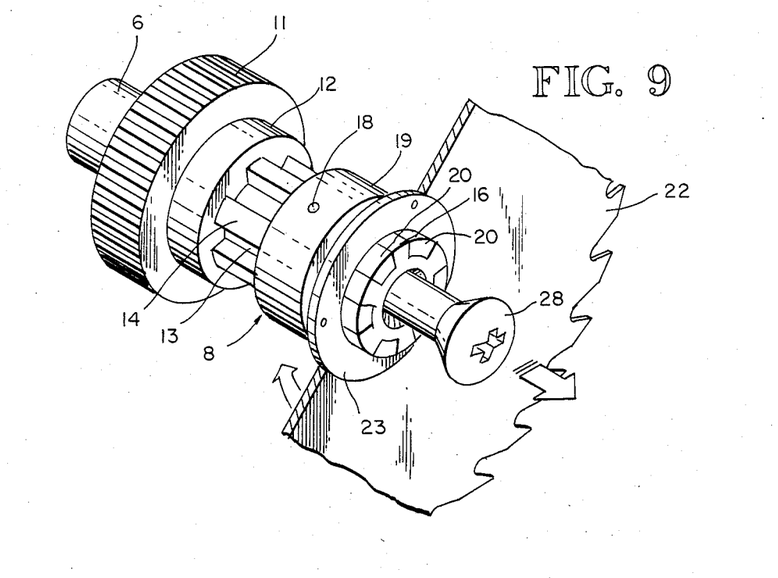
FIG. 9 is a perspective view with direction indication arrows to illustrate the continuing quick locking movements which occur in reaching the locked ready to use position, and again only a portion of the saw blade is shown for purposes of illustration.

The assembled unit is shown in the locked position in FIG. 9, wherein the slide locking fingers 20 extend forward, just short of the ends of locking lands 16 and pass through six spaces 31 between the locking fingers 20. In respect to getting to this locked position, note FIGS. 7 and 9, whereby the assembled quick release mechanism 9 is shon in the "ready to load" position in FIG. 7. During installing the blade 22, step on is to line up the spline lands 32 of the splined hub 23, with the ends of the slide lock fingers 20 as shown in FIG. 7. Then step two is to press the circular saw blade 22 onto the splined arbor shaft 9, until the slide lock collar 19 bottoms out on forward arbor bearing surface 12 as shown in FIG. 8. This axially aligns, in depth, the spline lnads 32 of the hub 23 of the blade 22 with the six spaces 31 created in the circular slot 15 of the extended drive shaft 9. Also the spline lands 32 on the splined hub 23 are, at this time, axially aligned in depth with the locking fingers 20 of the slide lock collar 19.

With reference to FIG. 9, step three of the circular saw blade 22 insertion process is shown, wherein the blade 22 is rotated fifteen degrees, by a quick hand movement. During such rotation, the insert lands 32 of the splined hub 23 move into the six spaces 31, of the circular slot 15. Then the compressed spring 29 acting on the central bolt 26, via the lock pin 18, causes the slide lock collar 19 to move quickly forward, whereby its locking fingers 20, which have been cleared by spline lands 32 of the splined hub 23 of the circular saw blade 22, move through the adjacent insert grooves and on through the six spline grooves 13, where they are designated as the lock lands 16. At this locking time the central bolt head 28 is extending forwardly under the spring force, and also the slide lock collar 19 is extending forwardly. The circular saw blade 22 is now locked and the circular saw is ready for use.

Figure 10:
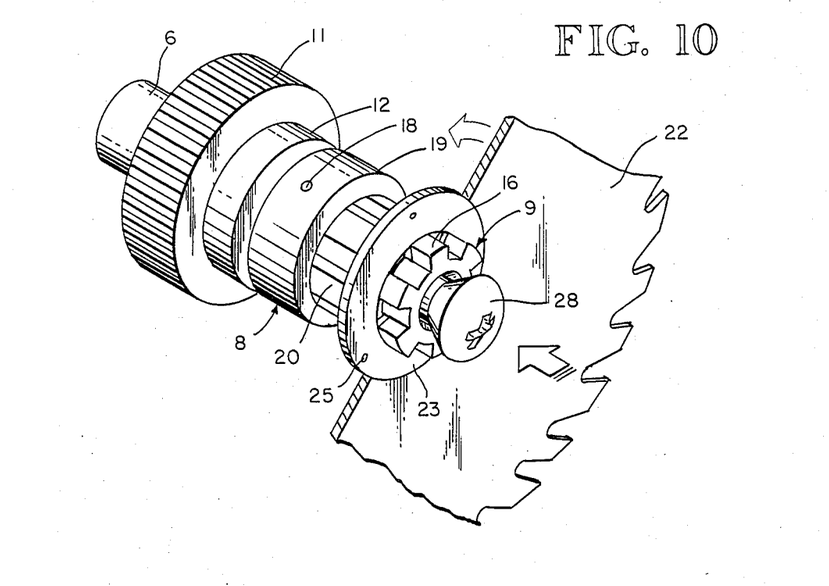
FIG. 10 is a perspective view with direction indication arrows, and one's finger, to illustrate movements occurring during removal of a saw blade just prior to the unlock eject position, as shown in FIG. 8.
Figure 11:
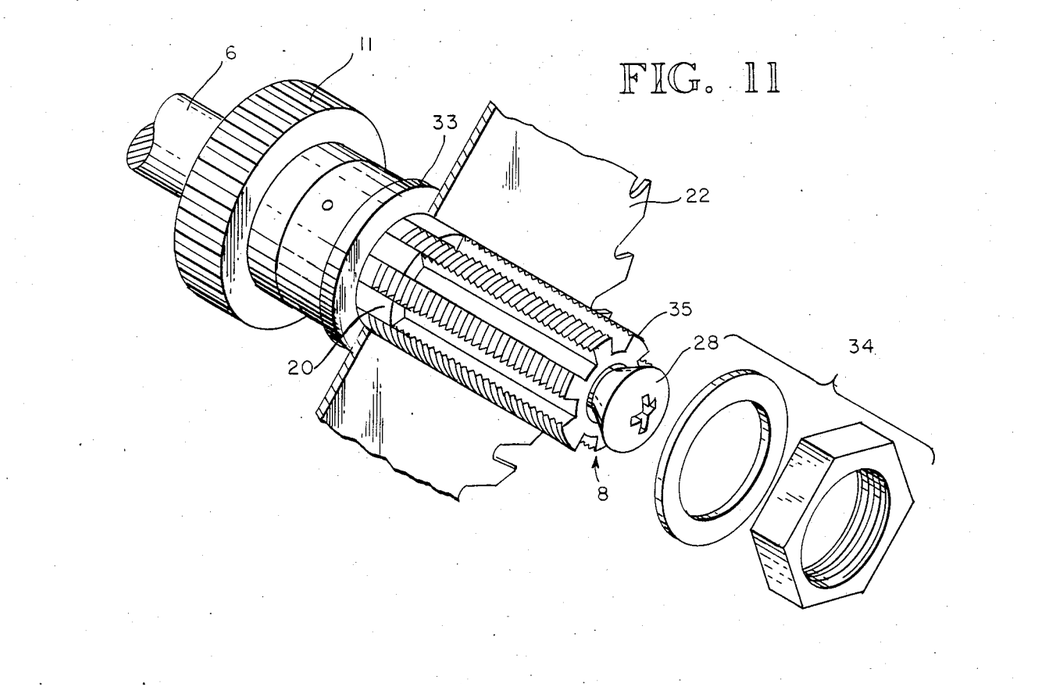
FIG. 11 is a perspective view of another embodiment of the quick change mechanism used in conjunction with a long shaft table saw arbor capable at all times in respect to a quick release function, and also to still utilize conventional dado or other multiple blade configurations, which create the wider cuts.

After a cutting operation, and, for example, another circular saw blade 22 is to be used, then as shown in FIG. 10, the circular saw blade 22 is removed by initially pressing or pushing in on the head 28, serving as the unlock button of the central bolt 26, until the slide lock collar 19 is fully retracted. At this initial time the spline lands 32 and related grooves of the splined hub 23 of the circular saw blade 22 are respectively lined up with the lock lands 16 and respective related grooves of the extended drive shaft 9. Then to continue the unlocking, as also shown in FIG. 10, the blade is rotated 15 degrees releasing the spline lands 32 of the splined hub 23 of the circular saw blade 22 for their outward removal via the grooves 13 of the extended shaft 9. When the unlock button 28 is released, the blade 22 is popped out by the force created by the compressed spring 29.

This quick release mechanism 8 is also used with a table saw, not shown, while still allowing for the use of dado sets and multiple saws. In FIG. 11, a modified long shaft 35 of a table saw is shown in conjunction with a rear flange 33 and a $\frac{5}{8}$" arbor hole circular saw hole blade 22 equipped with a splined hub 23. This long shaft 35 is threaded to receive a standard wobble dado blade or a standard multiple blade dado set, not shown. A conventional washer and hex nut combination 34 are used to hold the various combinations of cutters in place. The threaded portion of this long shaft 35 is machined, to also have six grooves 13 and six lands 14 to fit slide lock collar 19, and to provide the locking lands 16, as shown in FIGS. 3 through 10. The circular saw blade 22, washer and nut combination 39 fit on this long shaft 35 as shown in FIG. 11. An original rear flange 33 is reamed out to fit over the entire quick release mechanism 8, and to allow this mechanism 8 to fit snugly against the arbor shaft forward bearing surface 12. Thus both quick release adapted circular saw blades and other standard blades and/or dado attachments may be used.

Figure 12:
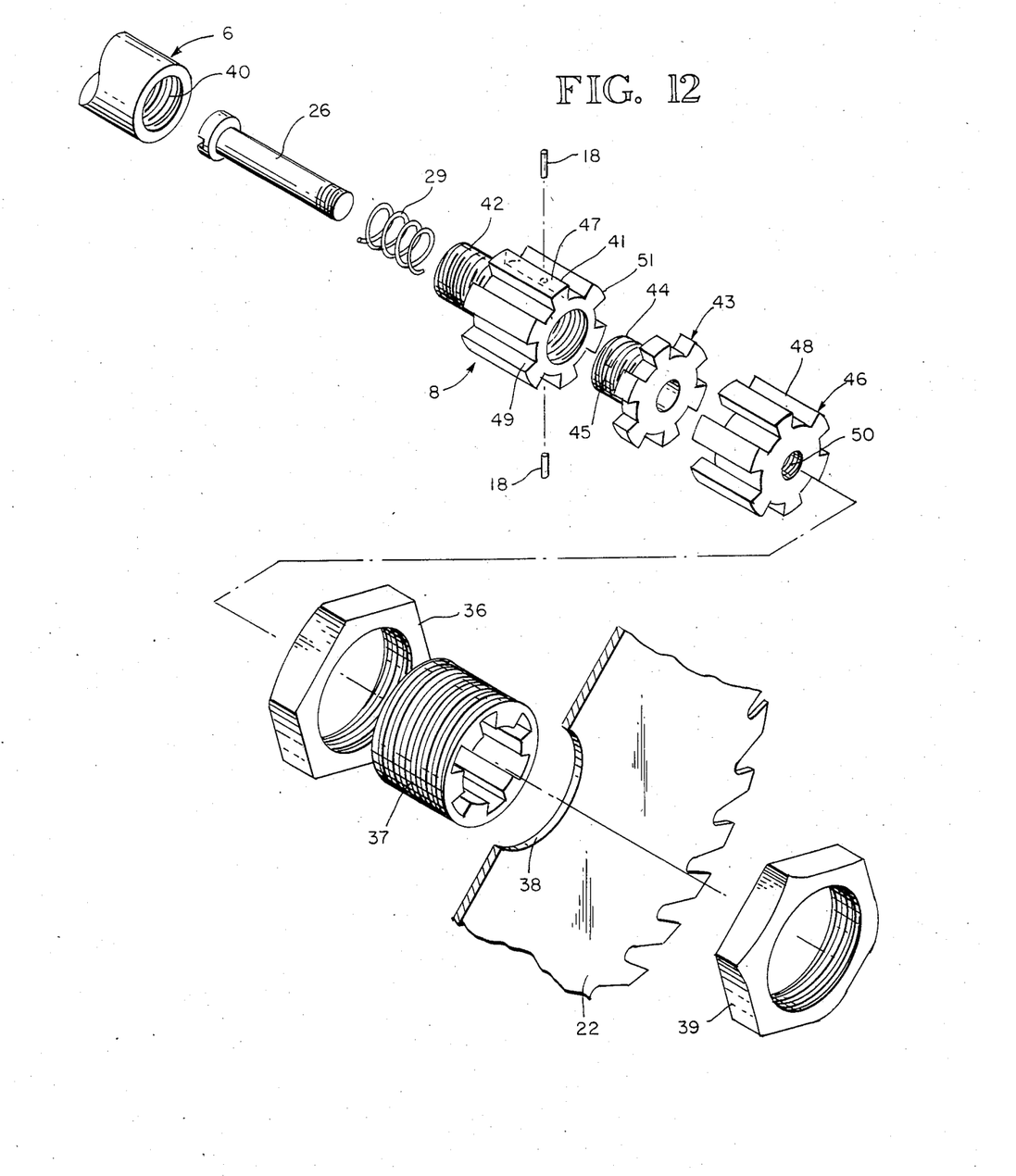
FIG. 12 is a perspective exploded view of another embodiment indicating the parts required for an alternate quick release arrangement for use on saws which do not have sufficient space between the blade position and the arbor bearing, and therefore the sliding lock collar is in front rather than behind the circular saw blade, and only a portion of the circular saw blade is shown, and also an embodiment of a removable blade holder is shown, being used for threaded attachment to a standard circular saw blade.

When a person prefers not to use a splined hub 23 secured to his or her circular saw blade, and yet this person wants to enjoy some of the quick change benefits, then he or she uses the splined blade holder or barrel 37, which has a nut head 35, as illustrated in FIG. 12. The splined blade holder or barrel 37 with its integral head 36 is inserted through the blade arbor hole 38 until its head 36 contacts the blade 22 and then the retaining nut 39 is threaded on and tightened.

Also, as illustrated in FIG. 12, another embodiment is used on power saws of various manufacturers, which have little or no space between the circular saw blade 22 and the forward arbor bearing surface 12. The blade holder having the splined blade holding barrel 37, is especially used in this embodiment. In this exploded perspective view, in respect to making comparisons with the embodiment of FIGS. 3 through 11, most of the parts which perform the same in function and which are similar in conformation, are consequently designated by the same numerals. Only those completely different parts or modified parts have been given new numbers.

One of the modified parts is the $\frac{5}{8}$" drive shaft 6 of a power saw 4. It is modified by providing a $\frac{3}{8}$" deep threaded hole 40, which is used to install the extended splined drive shaft 41, by screwing in its threaded extending shaft 42.

Then a rotatable spline lock 43 is threaded to the exterior splined drive shaft 41, by using its own threaded extending shaft 44, in which a transverse slot 45 is provided to receive a lock pin 18. This slot 44 limits the rotating of the rotatable spline lock 43 to 30 degrees relative to the extended splined drive shaft 41.

This rotatable spline lock 43 has two effective positions. In the unlocked position, its spline lands and grooves are lined up with those of the extended spline drive shaft 41. In its locked position its spline lands and grooves are not lined up with those of the extended drive shaft 41.

Figure 13:
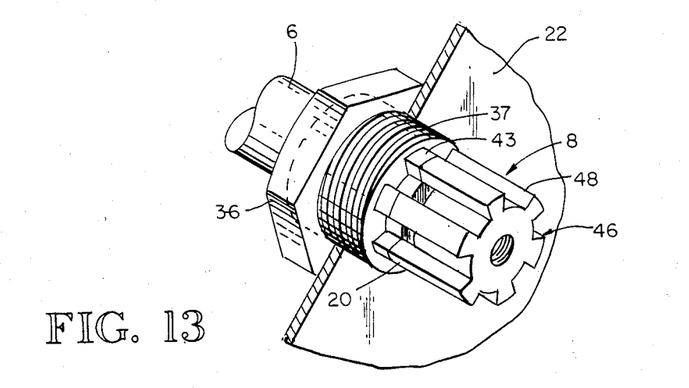
FIG. 13 is a perspective view showing the unlocked position of the embodiment illustrated in FIG. 12, and only a portion of the circular blade is shown, and its follow on nut is not shown.
Figure 14:
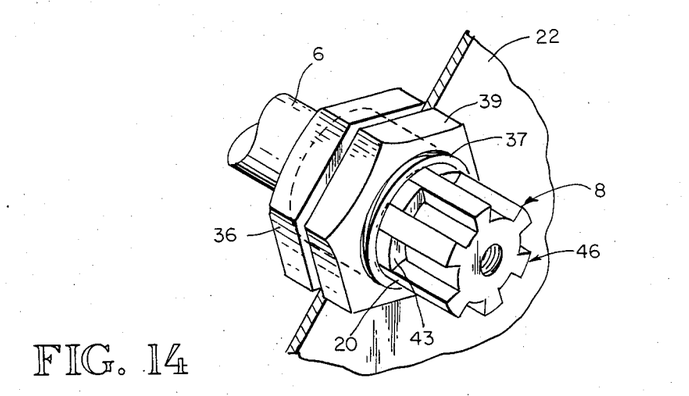
FIG. 14 is a perspective view of the embodiment illustrated in FIGS. 12 and 13, in the locked position, and only a portion of the circular blade is shown, and its follow on nut is shown.

In this embodiment, shown in FIGS. 12, 13 and 14, there is also a slide lock collar 46, however, it is made differently than the slide lock collar 19 shown in FIGS. 3 through 11. Its locking fingers 20 are a continuation of external lands 48 rather the internal lands. The inside face of the slide lock collar 46 is machined out a short distance, so that only the external lands remain, to become these locking fingers 20. They are sized to axially slide through the grooves of the rotating spline lock 43 and on into the circular slot 49 adjacent the ends of the drive shaft lands 47. This slide lock collar 46 is connected to the threaded central bolt 26 by utilizing its threaded hole 50 in its end cap 51. A compression spring 29 is fitted on the central bolt 26 between the bolt head 28 and the back side of the end cap 51 of the slide lock collar 46. When this subassembly is complete, the compression spring 29 is constantly biasing to slide lock collar 46 axially toward both the rotating spline lock 43 and the extended splined drive shaft 41.

In FIG. 13, the assembly, in the unlocked position, is illustrated of the components shown in the exploded view of FIG. 12 of this embodiment of the quick release mechanism 8. It is ready to receive a circular saw blade 22, which has been prefitted with the splined blade holder barrel 37. The head 36 of the barrel 37 and the retaining nut 39 of the blade holder are tightened to secure the barrel 37 with respect to the blade 22. The blade 22 is then rotated, if necessary, to align its internal spline lands and grooves of the blade holder barrel 37 for passing axially over: the slide lock collar 46; the rotatable spline lock 43; and the extended splined drive shaft 41, to thereafter abut the forward arbor bearing surface 12. The circular saw blade 22 is in its axial cutting position, but it is not, as yet axially locked in place.

In FIG. 14, the assembly, in the locked position, is illustrated of the components shown in the exploded view of FIG. 12 of this embodiment of the quick release mechanism 8. To commence the axial locking of the circular saw blade 22 in place, a person, using his or her fingers axially pulls on the slide lock collar 46, and while maintianing the pulling force, also counterclockwise rotates this collar 46, to clear its locking fingers 20 of the lands of the rotatable spline lock 43. Upon such clearance and release of collar 46 from one's fingers, the spring force axially moves the locking fingers 20 into the grooves of the rotatable spline lock 43.

Then with one's fingers the slide lock collar 46 is rotated, so its lock fingers 20 will rotate the rotatable spline lock 43, placing its lands opposite the lands of the splined blade holder barrel 37, thereby axially locking the circular saw blade 22 in place.

All that remains to complete the overall locking is to insure the slide lock collar 46 will not relatively rotate during the operation of the circular saw 4. Therefore this slide lock collar 46, after positioning the rotatable spline lock 43 in its locking position, is moved in further axially by the compression spring force, so the locking fingers 20 first used to position the rotatable spline lock 43, thereafter enter the grooves of the splined blade holder barrel 37, to prevent any relative rotation between them. In this way, during the high speed rotation of the circular saw blade 22, the slide lock collar 46 will not rotate relative to any other component of this quick release mechanism 8.

When the time arrives to change the circular saw blade 22, and preferably the power saw is disconnected from its electrical source, the person uses his or her fingers to axially pull on the slide lock collar 46, for only a short distance, to clear the locking fingers 20 from the grooves of the splined blade holder barrel 37. Then he or she counterclockwise rotates the slide lock collar 46, so its locking fingers 20 bear against the lands of the rotatable spline lock 43 to rotate this lock 43, so its lands and grooves are aligned with those of the lands and grooves of the extended splined drive shaft 42, and the lands and grooves of the splined blade holder barrel 37. Thereafter, the slide lock collar 46, while still being axially pulled, is further rotated counterclockwise, so the person has then fully aligned all the lands and grooves. Upon such alignment, the circular saw blade 22 is then axially withdrawn from: the extended splined drive shaft 41; the rotatable spline lock 43; and the slide lock collar 46; thereby being cleared from the circular saw 4.

In respect to all these embodiments, the changeover of circular saw blades, and/or sets of blades and/or dados, is undertaken quickly without the use of hand tools to remove the saws from the hand held power saws or table saws.

I claim:

1. A quick change mechanism, operable in seconds, to change rotatable work contacting members such as circular saw blades, dado sets, grinders, buffers, brushes, with respect to the drive shafts of power tools, comprising:

a. axial splines on the drive shaft having lands and grooves;

b. a radial slot to receive a rotatable work contacting member in its operational position, formed along these axial splines on the drive shaft, by cutting and removing a short section of all the spline lands to the level of the base of the spline grooves, thereby, in effect, creating receiving spaces, where the cutaway short sections of the spline lands had been located previously;

c. complementary axial splines having lands and grooves on the rotatable work contacting member, thereby permitting the endwise spline mounting on the rotatable work contacting member to the radial slot on the drive shaft, then the rotatable work contacting member is rotated relative to the drive shaft, thereby axially confining the rotatable work contacting member at the radial slot along the drive shaft, as the lands on the rotatable work contacting member are positioned in these receiving spaces, and are thereby aligned with the lands of the axial splines of the drive shaft; and d. a complementary splined locking member having lands and grooves and having extending lands of splines, for axial movement in grooves of the axial splines of the drive shaft, to be passed through the radial slot along the drive shaft, to thereby insure the lands of the splines of the rotatable work contacting member will remain in the receiving spaces of the radial slot, and therefore the rotatable work contacting member will remain axially and radially confined at the radial slot along the drive shaft, being thereby locked in place during the operations of the power tool.

2. A quick change mechanism, as claimed in claim 1, having in addition a spring, mounted in relation to the drive shaft and the complementary splined locking member, to keep the latter in its axial position, whereby its extending lands in turn keep the lands of the splines of the rotatable work contacting member in the receiving spaces of the radial slot, thus locking the rotatable work contacting member in place.

3. A quick change mechanism, as claimed in claim 2, wherein an axially aligned bolt is secured to the complementary splined locking member, whereby intended movements of the axially aligned bolt are utilized, when moving the complementary splined locking member against the force of the spring during unlocking of the rotatable work contacing member.

4. A quick change mechanism, as claimed in claim 3, wherein the complementary splined locking member has internal splines with extending lands of splines, and this locking member is slidably fitted over the axial splines, which are formed on the exterior of the drive shaft and cut away to form the radial slot.

5. A quick change mechanism, as claimed in claim 4, whereby the axial splines on the rotatable work contacting member are on a hub which is fitted to a central arbor hole.

6. A quick change mechanism, as claimed in claim 5, whereby a transverse pin is used to secure the axially aligned bolt to the complementary splined locking member.

7. A quick change mechanism as claimed in claim 6, whereby a longitudinal slot is provided in the splined shaft to longitudinally guide and limit the movement of both the bolt and the complementary splined locking member relative to the splined shaft.

8. A quick change mechanism, as claimed in claim 3, wherein the complementary splined locking member has external splines with extending lands of splines, which in part extend into the grooves of the splines of the shaft.

9. A quick change mechanism, as claimed in claim 8, wherein the radial slot having the receiving spaces is at the end of the drive shaft, and a threaded or splined shaft extension serving as a radially moved lock, is threadably and rotatably secured to the end of the shaft.

10. A quick change mechanism, as claimed in claim 9, whereby a transverse pin is used to secure the axially aligned bolt to the complementary splined shaft.

11. A quick change mechanism, as claimed in claim 10, whereby the radial slot is provided in the threaded splined on shaft extension to radially guide and axially limit the rotatable work contacting members movement relative to the splined shaft.

12. A quick change mechanism, as claimed in claim 11, whereby threads are provided on the complementary splined locking member to secure it to the axially aligned bolt.

13. A quick change mechanism, as claimed in claim 12, whereby the axial splines on the rotatable owrk contacting member are on the inside of a barrel, and threads are on the outside of the barrel to receive the arbor hole of the rotatable work contacting member, and to receive nuts positioned to be tightened on respective sides of the rotatable work contacting member, and the rotatable work contacting member, with its splines aligned with the splines, respectively, of the: splined locking member; the threaded splined shaft extension; and the shaft, is then axially passed over them for placement into its working position, at the radial slot and thereafter, it is so held, upon the locking rotation of the shaft extension, as this locking rotation is maintained, upon the subsequent axial movement, under spring force, of the splined locking member, whereby the external splines thereof move past the receiving spaces in continuing into the splines of the shaft.

* * * * *